United States Patent [19]
George

[11] Patent Number: 5,847,777
[45] Date of Patent: Dec. 8, 1998

[54] RIGHT-EDGE DIFFERENTIAL ERROR CONVERGENCE CORRECTION

[76] Inventor: John Barrett George, 11408 Lakeshore Dr. E., Carmel, Ind. 46033

[21] Appl. No.: 589,178

[22] Filed: Jan. 19, 1996

Related U.S. Application Data

[63] Continuation-in-part of Ser. No. 463,426, Jun. 5, 1995, abandoned, which is a continuation-in-part of Ser. No. 471,319, May 19, 1995, abandoned, which is a continuation-in-part of Ser. No. 241,023, May 11, 1994, Pat. No. 5,508,593.

[51] Int. Cl.⁶ .............................. H04N 3/233; G09G 1/04
[52] U.S. Cl. ......................... 348/746; 348/747; 315/371; 315/370
[58] Field of Search ................... 348/806, 807, 348/746, 747, 745; 315/371, 370, 368.11, 368.18; H04N 3/28, 3/23, 3/223

[56] References Cited

U.S. PATENT DOCUMENTS

| | | | |
|---|---|---|---|
| 2,880,358 | 3/1959 | Parker | 315/13 |
| 4,395,662 | 7/1983 | Sexton, Jr. | 348/746 |
| 4,563,618 | 1/1986 | Haferl | 315/370 |
| 4,766,354 | 8/1988 | Oliver | 315/371 |
| 4,810,939 | 3/1989 | Watanabe et al. | 315/371 |
| 4,816,908 | 3/1989 | Colineau et al. | 358/60 |
| 5,034,664 | 7/1991 | Fernsler et al. | 315/370 |
| 5,166,576 | 11/1992 | Roussel et al. | 313/431 |
| 5,179,319 | 1/1993 | Iwasaki et al. | 313/440 |
| 5,200,815 | 4/1993 | Tsujihara et al. | 348/807 |
| 5,282,033 | 1/1994 | Gleim et al. | 358/139 |
| 5,298,985 | 3/1994 | Tsujihara et al. | 348/807 |
| 5,369,450 | 11/1994 | Haseltine et al. | 348/746 |
| 5,444,388 | 8/1995 | George et al. | 348/746 |

FOREIGN PATENT DOCUMENTS

| | | | |
|---|---|---|---|
| 0 594 432 A2 | 4/1994 | European Pat. Off. | H04N 3/233 |
| 0 642 262 A2 | 3/1995 | European Pat. Off. | H04N 3/233 |
| 0 682 444 A1 | 11/1995 | European Pat. Off. | H04N 3/233 |

OTHER PUBLICATIONS

John Barrett George, U.S. application serial No. 08/241,023, entitled Differential Error Convergence Correction, examined by T. Blum in Group 2202, allowed on Oct. 31, 1995 in issue batch No.Q65.

*Primary Examiner*—Michael Lee
*Attorney, Agent, or Firm*—Joseph S. Tripoli; Joseph J. Laks; Marion P. Metelski

[57] ABSTRACT

A convergence correction circuit, for a cathode ray tube projecting images having keystone, differential sinusoidal and differential right-edge curl distortions, comprises generators for horizontal-rate, generally sinusoidal, horizontal-rate sawtooth and horizontal-rate pulse waveforms. A summer combines the horizontal-rate waveforms into a horizontal-rate composite waveform. A multiplier and an amplifier generate as an output signal a product of the horizontal-rate composite waveform and a vertical-rate sawtooth waveform. A convergence correction coil is coupled for receiving the output signal and generating a dynamic magnetic field correcting the keystone, differential sinusoidal and differential right-edge curl distortions.

14 Claims, 10 Drawing Sheets

RIGHT-EDGE DIFFERENTIAL ERROR CONVERGENCE CORRECTION

CROSS-REFERENCE TO RELATED APPLICATIONS

This application is a continuation-in-part of U.S. application Ser. No. 08/463,426, entitled RIGHT-EDGE DIFFERENTIAL ERROR CONVERGENCE CORRECTION, which was filed on Jun. 5, 1996, and is now abandoned. U.S. application Ser. No. 08/463,426 is a continuation-in-part of U.S. application Ser. No. 08/471,319, entitled RIGHT-EDGE DIFFERENTIAL ERROR CONVERGENCE CORRECTION, which was filed on May 19, 1995, and is now abandoned. U.S. application Ser. No. 08/471,319 is a continuation-in-part of U.S. application Ser. No. 08/241,023, entitled DIFFERENTIAL ERROR CONVERGENCE CORRECTION, which was filed on May 11, 1994, and which was issued as U.S. Pat. No. 5,508,593 on Apr. 16, 1996.

FIELD OF THE INVENTION

This invention relates generally to the field of convergence correction.

BACKGROUND OF THE INVENTION

Projection television receivers are subject to numerous picture distortions because all three projection cathode ray tubes (CRTs) used in such receivers are off axis with respect to one another and two of the three projection CRT's are off axis with respect to a flat screen, as shown diagrammatically, for example, in the lower right hand corner of FIG. 4. Dynamic convergence correction requires that numerous convergence correction signals be generated and applied to a set of auxiliary convergence correction coils in the horizontal and vertical deflection yokes of each CRT.

In projection television receivers using curved face plate CRTs, which have a concave face plate curvature, a differential sine shaped distortion related to the keystone distortion of the red and blue images has been identified. With reference to FIG. 1, this distortion causes the blue horizontal lines (dotted in FIG. 1) of an otherwise converged picture to be above the green and red lines in the upper left (UL) and lower right (LR) quadrants of the picture and to be below the green and red lines in the upper right (UR) and lower left (LL) quadrants of the picture. Similarly, red horizontal lines (dash-dotted in FIG. 1) of an otherwise converged picture are above the green and blue lines in the upper right (UR) and lower left (LL) quadrants of the picture and are below the green and blue lines in the lower right (LR) and upper left (UL) quadrants of the picture. This distortion is zero amplitude at the horizontal centerline (HCL) and increases in amplitude toward the top and bottom of the picture. It can be seen that this distortion is generally sinusoidal.

A second distortion causes the red and blue horizontal lines to curl differentially up and down at the left edge of the picture, as shown in FIG. 2. This distortion has been found to be due to slow response time in the convergence power amplifiers.

A third distortion common to all projection television receivers is keystone distortion, as shown in FIG. 3. Since the green CRT optical axis is orthogonal to the screen surface at the screen center, there is very little keystone distortion in the green picture. Similarly, since the red and blue CRT optical axes are in the plane that includes the screen horizontal centerline and is perpendicular to the screen surface there is very little vertical keystone distortion of red and blue. However, the red and blue CRTs are offset from the screen center horizontally and tilted inward. The red and blue CRTs are located on either side of the green CRT. This arrangement causes equal and opposite horizontal keystone distortions of red and blue. The red and blue pictures have parallel left and right edges and oppositely diverging top and bottom edges. Keystone distortion has been corrected by a signal which represents the product of a horizontal-rate sawtooth and a vertical-rate sawtooth. Such a signal is also referred to by the nomenclature "horizontal saw X vertical saw". Other convergence correction waveforms are also referred to in similar nomenclature as the product of other signals. The product is a vertical-rate "bow tie" shaped output signal, as shown in FIG. 6, where the horizontal-rate sawtooth has a maximum amplitude at the top and bottom of the picture and zero amplitude at the horizontal centerline. The horizontal phase reverses at the horizontal centerline. Accordingly, the keystone distortion correction waveforms for red and blue must be of opposite polarity and are mainly applied to the red and blue vertical convergence correction coils.

The correction of particular convergence errors, or distortions, can often interfere with the correction of other convergence errors due to the many convergence correction signals which are applied to the convergence correction coils of the horizontal and vertical deflection yokes. The problems raised by the differential sine and the left and right edge curl distortions are firstly, the correction of such distortions, and secondly, the correction of such distortions without interfering with other convergence corrections.

The differential sine distortion of red and blue in the horizontal lines is sine-shaped. Accordingly, a horizontal-rate sine correction multiplied by a vertical saw can be used to correct it. The differential sine distortion of red and blue can be corrected by adding a horizontal sine signal to the same horizontal sawtooth signal used for generating the keystone distortion correction signal before that horizontal sawtooth signal is multiplied by the vertical sawtooth signal to produce the keystone distortion correction signal. The sine phase is chosen so that the top and bottom peaks of the horizontal saw appear limited and the zero crossing has an increased slope.

The left-edge differential curl can be corrected by developing an overdrive pulse during horizontal retrace, and adding that overdrive pulse to the horizontal sine signal and to the horizontal sawtooth signal, also before multiplication with the vertical sawtooth signal, to speed up the amplifier response.

As a result of a subsequent, and successful, effort to reduce crosstalk, which is the presence of horizontal-rate currents in the vertical yoke windings, by applying equal damping to each of the vertical yoke coils, it was discovered that the equal damping also corrected the differential curl distortion at the left edge of the picture. In addition to, and concurrently with, the application of equal damping to each of the vertical yoke coils, the horizontal sawtooth signal was shifted earlier in time to center the pivot point of the vertical skew control. This phase change, however, was found to cause a fourth distortion, which causes the red and blue horizontal lines to curl differentially up and down, respectively, at the right edge of the picture, as shown in FIG. 11.

SUMMARY OF THE INVENTION

It has been determined that the right-edge differential curl can be corrected by developing a negative pulse from a horizontal right linearity signal and adding that negative pulse to the horizontal, generally sinusoidal signal and the horizontal sawtooth signal before multiplication with the vertical sawtooth signal.

A correction circuit for a cathode ray tube displaying images subject to distortion comprises: means for generating a horizontal-rate sawtooth waveform; means for generating a horizontal-rate, generally sinsusoidal sine waveform; means for generating a horizontal-rate pulse waveform; means for summing the horizontal-rate sawtooth, generally sinusoidal and pulse waveforms to define a horizontal-rate composite waveform; means for generating as an output signal a product of the horizontal-rate composite waveform and a vertical-rate waveform, the horizontal-rate composite waveform being DC coupled to the product generating means; means for amplifying the output signal; and a correction coil for the cathode ray tube coupled for receiving the amplified output signal and generating a dynamic magnetic field responsive to the output signal, the output signal having a first component for correcting a keystone distortion, a second component for correcting a red/blue differential generally sinusoidal distortion and a third component for correcting a red/blue differential right-edge curl distortion.

According to a feature of an inventive arrangement taught herein, a correction circuit for a cathode ray tube displaying images subject to distortion comprises: means for generating a horizontal-rate sawtooth waveform; means for generating a horizontal-rate pulse waveform; means for generating a horizontal-rate, generally sinusoidal waveform; means for summing the horizontal-rate sawtooth, pulse and generally sinusoidal waveforms to define a horizontal-rate composite waveform; means for generating as an output signal a product of the horizontal-rate composite waveform and a vertical-rate waveform, the horizontal-rate composite waveform being DC coupled to the product generating means; means for amplifying the output signal; and, a correction coil for the cathode ray tube coupled for receiving the amplified output signal and generating a dynamic magnetic field responsive to the output signal, the output signal having a first component for correcting a keystone distortion, a second component for correcting a red/blue sinusoidal distortion and a third component for correcting a red/blue right-edge curl distortion.

A projection television receiver comprises: a plurality of cathode ray tubes, each of the cathode ray tubes having a vertical yoke coil and each of the vertical yoke coils coupled to one another in series; a plurality of equal damping resistances, each of the equal damping resistances coupled in parallel across one of the vertical yoke coils; means for summing three horizontal-rate waveforms for each of the cathode ray tubes to define a horizontal-rate composite waveform for each of the cathode ray tubes; means for generating as an output signal for each of the cathode ray tubes a product of the horizontal-rate composite waveform for each of the cathode ray tubes and a vertical rate waveform for each of the cathode ray tubes; means for amplifying the output signal for each of the cathode ray tubes; and a plurality of correction coils, each of the correction coils coupled to one of the cathode ray tubes for receiving the amplified output signal of the cathode ray tube and generating a dynamic magnetic field for the cathode ray tube responsive to the output signal, the output signal having a first component for correcting a keystone distortion, a second component for correcting a red/blue sine distortion and a third component for correcting a red/blue right-edge curl distortion.

According to a feature of an inventive arrangement taught herein, a projection television receiver comprises: a plurality of cathode ray tubes, each of the cathode ray tubes having a vertical yoke coil and each of the vertical yoke coils coupled to one another in series; a plurality of damping resistances, each of the damping resistances coupled in parallel with an associated one of the vertical yoke coils; means for generating a horizontal-rate sawtooth waveform; means for generating a horizontal-rate pulse waveform; means for generating a horizontal-rate, generally sinusoidal waveform; means for summing the horizontal-rate sawtooth, pulse and generally sinusoidal waveforms to define a horizontal-rate composite waveform; means for generating as an output signal a product of the horizontal-rate composite waveform and a vertical-rate waveform, the horizontal-rate composite waveform being DC coupled to the product generating means; means for amplifying the output signal; and, a correction coil for one of the cathode ray tubes coupled for receiving the amplified output signal and generating a dynamic magnetic field responsive to the output signal, the output signal having a first component for correcting a keystone distortion, a second component for correcting a red/blue sinusoidal distortion and a third component for correcting a red/blue right-edge curl distortion. The damping resistances may be equal.

The keystone distortion is due to off-axis orientation of the cathode ray tube; the red/blue differential sinusoidal distortion is due to face plate geometry of the cathode ray tube; and the right-edge curl is influenced by a shift of the reset pulse of the horizontal sawtooth waveform to an earlier time with respect to horizontal retrace to center the pivot point of the vertical skew and key adjustments.

The above, and other features and advantages of the present invention, will become apparent from the following description read in conjunction with the accompanying drawings, in which like reference numerals designate the same elements.

DETAILED DESCRIPTION OF THE PREFERRED EMBODIMENTS

Figure 4:
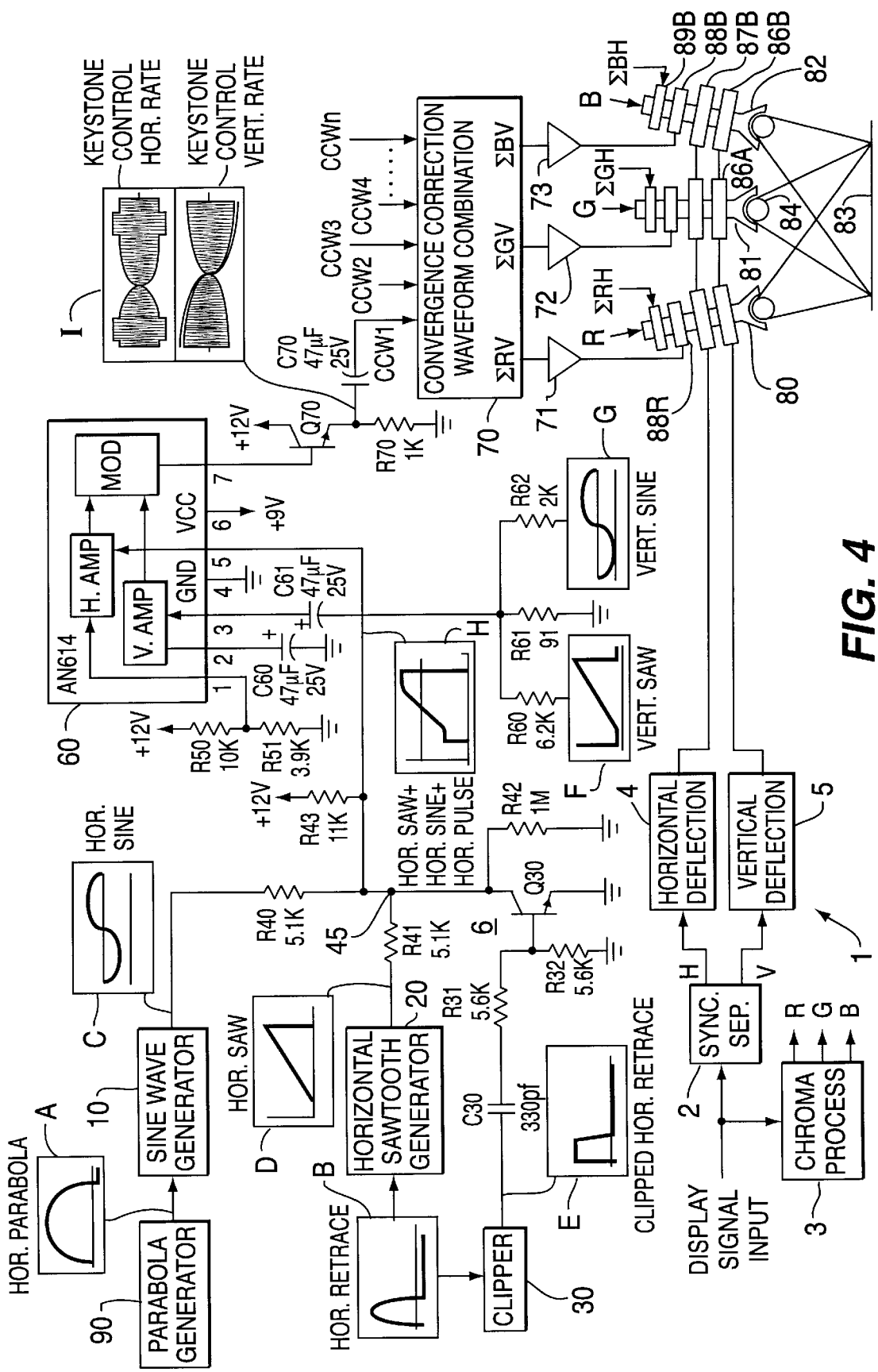
FIG. 4 is a diagram, in block and schematic form, of a projection television receiver, including a circuit for correcting keystone distortion, differential sine distortion of red and blue in the horizontal lines and differential left-edge curl distortion of horizontal lines.

A projection television receiver is shown in block and schematic form in FIG. 4 and is generally designated by reference numeral 1. The receiver comprises a synchronizing signal separator 2 and a chrominance processor 3, each responsive to a display signal input. Horizontal synchronizing components H and vertical synchronizing components V are supplied to horizontal and vertical deflection circuits 4 and 5, respectively. Three projection CRT's 80, 81 and 82 are provided for red R, green G and blue 13 signals respectively, as generated by the chrominance processor 3. Each CRT displays a monochrome image corresponding to its color onto screen 83, using a lens 84. Only the green CRT 81 is orthogonal with the screen 83. The red and blue CRTs are located on either side of the green CRT, offset from the screen center horizontally and tilted inward. This arrangement causes equal and opposite horizontal keystone distortions of red and blue as described above. The red and blue pictures have parallel left and right edges and oppositely diverging top and bottom edges.

Each CRT is provided with deflection yokes. Each horizontal deflection yoke includes a main vertical deflection coil 86, a main horizontal deflection coil 87, an auxiliary vertical deflection coil 88 for vertical convergence correction and an auxiliary horizontal deflection coil 89 for horizontal convergence correction. The various coils of the respective CRT's are distinguished as necessary by the suffixes R, G and B for red, green and blue respectively. A system for generating a plurality of waveforms for convergence correction is generally designated by reference numeral 6.

Convergence correction system 6 receives and/or generates a plurality of different waveforms which are scaled, added and/or multiplied in a wide variety of combinations to provide six composite convergence correction waveforms, representing corrections for red horizontal (ΣRH), red vertical (ΣRV), green horizontal (ΣGH), green vertical (ΣGV), blue horizontal (ΣBH) and blue vertical (ΣBV). The ΣRV output signal is coupled to the convergence correction coil 88R through output amplifier 71. The ΣGV and ΣBV output signals are coupled to their respective convergence correction coils through output amplifiers 72 and 73 respectively.

A circuit for generating only one such convergence correction waveform, designated waveform I, is shown in detail in FIG. 4. Waveform I is a first convergence correction waveform CCW1 input to a convergence correction waveform combination circuit 70. Waveform CCW1 (I) is the product of a waveform multiplication. The output signal of the multiplier is buffered by transistor Q70 and AC coupled to the convergence correction waveform combination circuit 70 through capacitor C70. Other convergence correction waveforms are inputs CCW2 through CCWn. Forty or more such convergence correction waveforms may be required.

Waveform I represents the product of two signals. One signal is generally a vertical-rate saw, shown as waveform F. The vertical saw F has a peak to peak voltage of 4.25 volts and a DC level of 5.3 volts. A small amount of size correction is done in the vertical direction by adding a small amplitude vertical-rate sine, shown as waveform G, to the vertical saw F. The vertical sine G has a peak to peak voltage of 0.2 volts and a DC level of 0.1 volts. Vertical saw F and vertical sine G are summed in a resistive summing network formed by resistors R60, R61 and R62. This corrects the gain of the correction of horizontal lines at the top and bottom of the picture. The other signal is waveform H, which is itself the sum of waveforms C, D and E.

Figure 5:
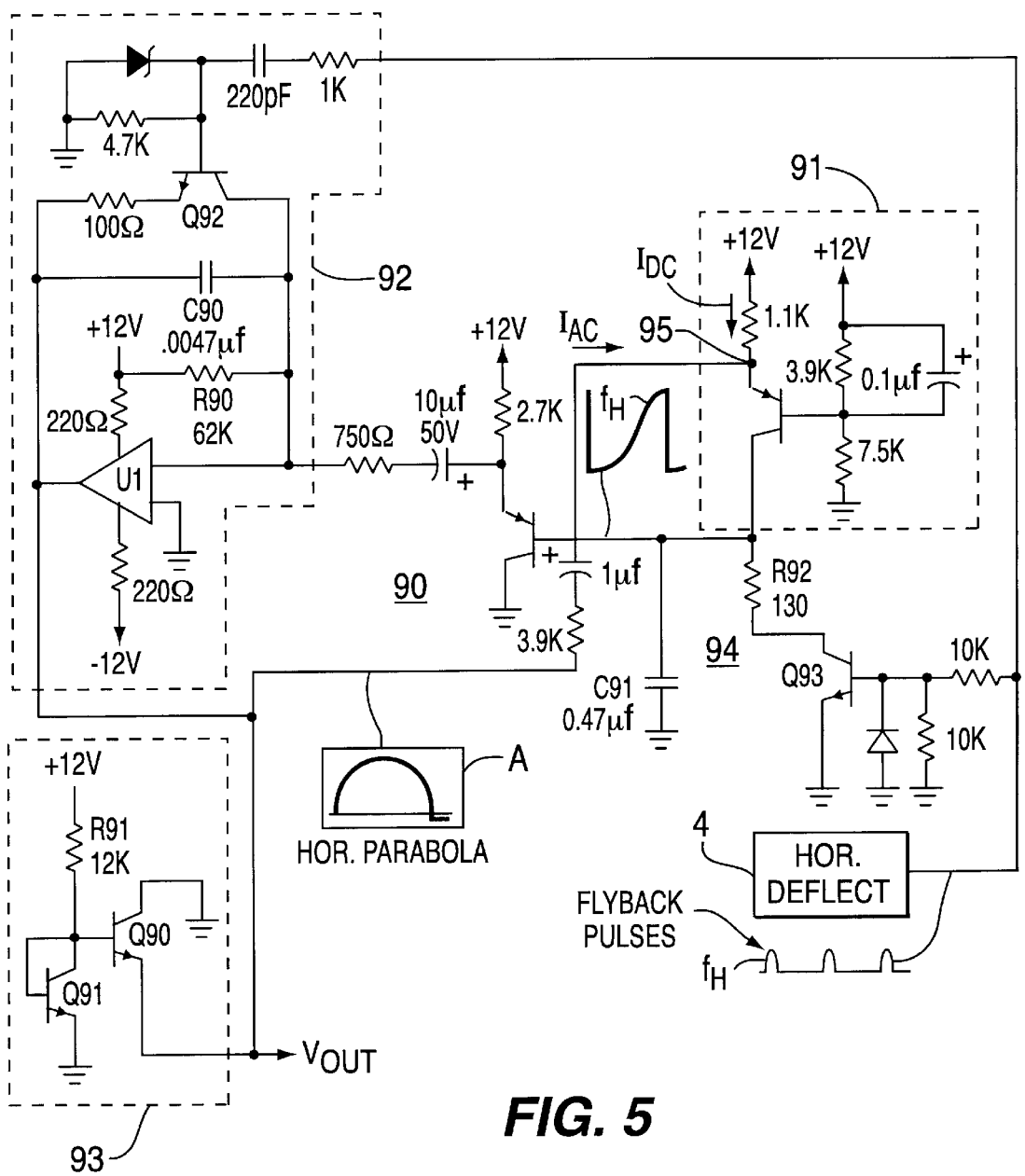
FIG. 5 is a schematic diagram of the parabola generator shown in FIG. 4.
Figure 6:
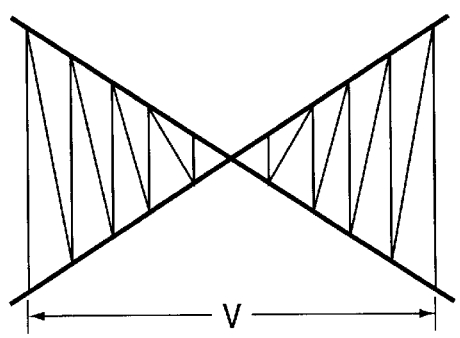
FIG. 6 is a diagram useful for explaining waveforms used for correction of keystone distortion.

The generation of waveform H begins with a horizontal-rate parabola, designated waveform A, that is supplied to a sine wave generator 10, which develops the generally sinusoidal wave designated waveform C. The horizontal-rate parabola has a positive peak voltage of +5.6 volts and a negative peak voltage of −0.1 volts. Moreover, the horizontal-rate parabola leads the main scan by the delay in the convergence power amplifier, which is about 5 μsec. It is also necessary to shape the parabola to achieve straight horizontal lines in the picture. Such a horizontal-rate parabola can be generated by the circuit 90 shown in FIG. 5, or by the circuit 190 shown in FIGS. 12 and 15. With reference to FIG. 5, a constant current $I_{DC}$ is generated by source 91. A variable feedback current $I_{AC}$ is summed with current $I_{DC}$ at junction 95. The composite current charges capacitor C91. Capacitor C91 is periodically discharged by reset circuit 94, by horizontal retrace pulses from horizontal deflection circuit 4, which turn transistor Q93 "on" at the horizontal-rate. The result is a horizontal-rate sawtooth signal as shown, which is AC coupled to integrator 92. Integrator 92 includes an operational amplifier U1 having an integrating capacitor C90 and a DC biasing circuit including R90. The output parabola waveform A is AC coupled to junction 95 as the variable current $I_{AC}$. A clamp circuit 93 coupled to the output of integrator 92 includes transistors Q90 and Q91 and resistor R91.

The horizontal reset pulses are AC coupled so that only its rising edge resets the horizontal parabola. This allows integration to start about 5 μsec ahead of the end of the horizontal reset pulses. The DC current bias supplied by resistor R90 to the inverting input of U1 is used at the input to the integrator to tilt the horizontal parabola so that the peak occurs about 5 μsec before the center of horizontal scan. Normally, after the peak, the parabola continues in a negative direction until the retrace pulse occurs and, resets the output back to zero. However, a negative going overshoot results when the DC bias tilts the horizontal parabola and the useful part of the horizontal parabola ends about 5 μsec before the horizontal reset pules start. This causes horizontal lines to flair at the right edge of the picture. The clamp 93 clips the negative going parabola at about −100 mV. This was determined to be the best level for achieving straight horizontal lines at the right edge of the picture. This level can be critical and is maintained by the clamp 93 even as temperature changes occur. Transistor Q91 receives a nearly constant current at its collector of about 1 mA. A small fraction of this current, determined by the DC beta of transistor Q91, flows into the base of transistor Q90 and determines the base to emitter voltage which is forced by feedback to also be the collector to emitter voltage. The current that flows in transistor Q90 during clamping is about 10 mA. Transistors Q90 and Q91 are of the same type operating in a similar ambient temperature. The higher collector current in transistor Q90 causes a larger base to emitter voltage than in transistor Q91, such that the difference, about 100 mV, tends to stay constant with temperature changes.

Integration of the horizontal parabola is reset by the discharge of the integration capacitor C90 by transistor Q92 during the first half of the horizontal reset pulses and is allowed to start during the second half of the horizontal reset pulses. The function being integrated during this time is a negative going capacitance discharge due to the effect of resistor R92 and transistor Q93 on the voltage of capacitor C91. This causes an increasing positive slope in the horizontal parabola during the first 5 $\mu$sec of integration instead of the decreasing positive slope that is characteristic of a parabola. This flaring of the horizontal parabola helps straighten the horizontal lines at the left edge of the picture.

Figure 7:
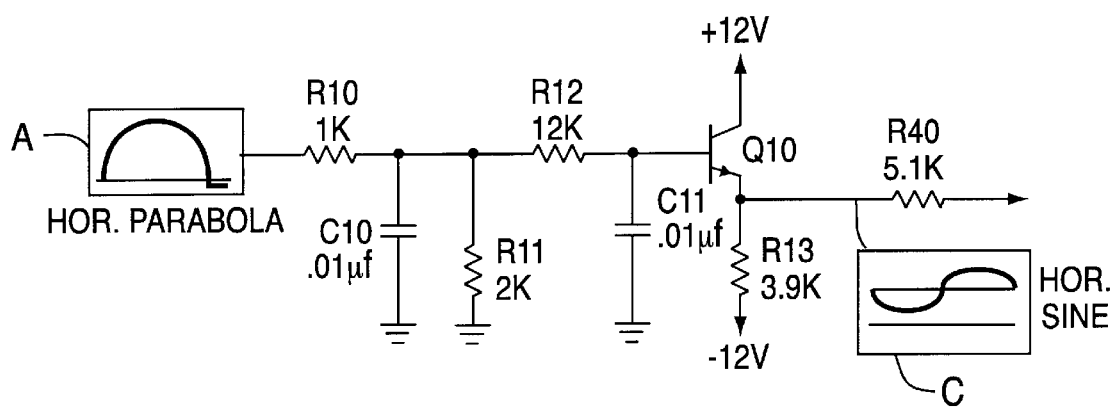
FIG. 7 is a schematic diagram of the sine wave generator shown in FIG. 4.

Referring back to FIG. 4, the horizontal parabola waveform A is low pass filtered and phase shifted in sine wave generator 10 to produce the waveform C, shown as a horizontal sine with a positive going zero crossing about 5 $\mu$sec before horizontal mid scan, a DC average value of 1.35 volts and a 1.6 volts peak to peak amplitude. A circuit schematic for the sine wave generator 10 is shown in FIG. 7. The horizontal parabola is low pass filtered by a network including resistors R10, R11 and R12 and capacitors C10 and C11. The filtered signal is buffered by transistor Q10, which is emitter biased by resistor R13.

Referring back to FIG. 4, a horizontal sawtooth generator 20 produces the horizontal sawtooth signal as shown in waveform D. Horizontal sawtooth generator 20 is shown in more detail in FIG. 8. A current source charges a capacitor C20. The capacitor C20 is rapidly discharged at the beginning of the 10 $\mu$sec horizontal retrace pulses by conduction of transistor Q20. The horizontal retrace pulses are 22 volts peak to peak, having a positive peak of +18 volts and a negative peak of −4 volts, as shown by waveform B. The resulting waveform D is 0 volts for 10 $\mu$sec during horizontal retrace and increases to a peak amplitude of 3.6 volts during trace. The DC average is about 1.5 volts.

A voltage divider is formed by resistors R43 and R42, coupled in series between +12 volts and ground. The junction of resistors R43 and R42 forms a resistive summing junction 45 for the horizontal sine C and the horizontal sawtooth D, which are coupled to the summing junction 45 by resistors R40 and R41 respectively.

The summing junction 45 is DC coupled to the differential input pin 5 input of a signal multiplier 60, for example a Panasonic AN614 multiplier. The opposing differential input, pin 1, is biased by a voltage divider formed by resistors R50 and R51 coupled in series between +12V and ground. The resulting bias level is about 3.4 volts, which is equal to the DC value of the sum of the horizontal saw and horizontal sine about 5 $\mu$sec before horizontal mid scan. Since both sides of the differential input are referenced equally to the +12V supply, any variations of this supply cancel. Such DC coupling is an unconventional bias arrangement for multipliers like the AN614, which are usually AC coupled to the signal sources being multiplied. For example, the summed signal representing the combination of waveforms F and G is AC coupled to pin 3 of multiplier 60 through capacitor C61.

The DC coupling is used to solve another problem, namely the differential left-edge curl. The solution entails the addition of a pulse signal during horizontal retrace that speeds the response time of the convergence output amplifier and straightens the red and blue differential curl at the left edge of the picture. If AC coupling is used, this retrace pulse addition distorts the response during trace time. This occurs because the composite waveform has a new DC average and a shift occurs that moves the balance point of the differential amplifier away from the desired time during trace. DC coupling allows addition of the pulse during retrace without disturbance of the amplifier balance during trace. Additionally, it was discovered that with DC coupling a very large pulse could be used during retrace, and that the peak of the output would be controlled by the amplifier's internal design. This means that power amplifier response can be adjusted with pulse duration rather than amplitude.

Figure 8:
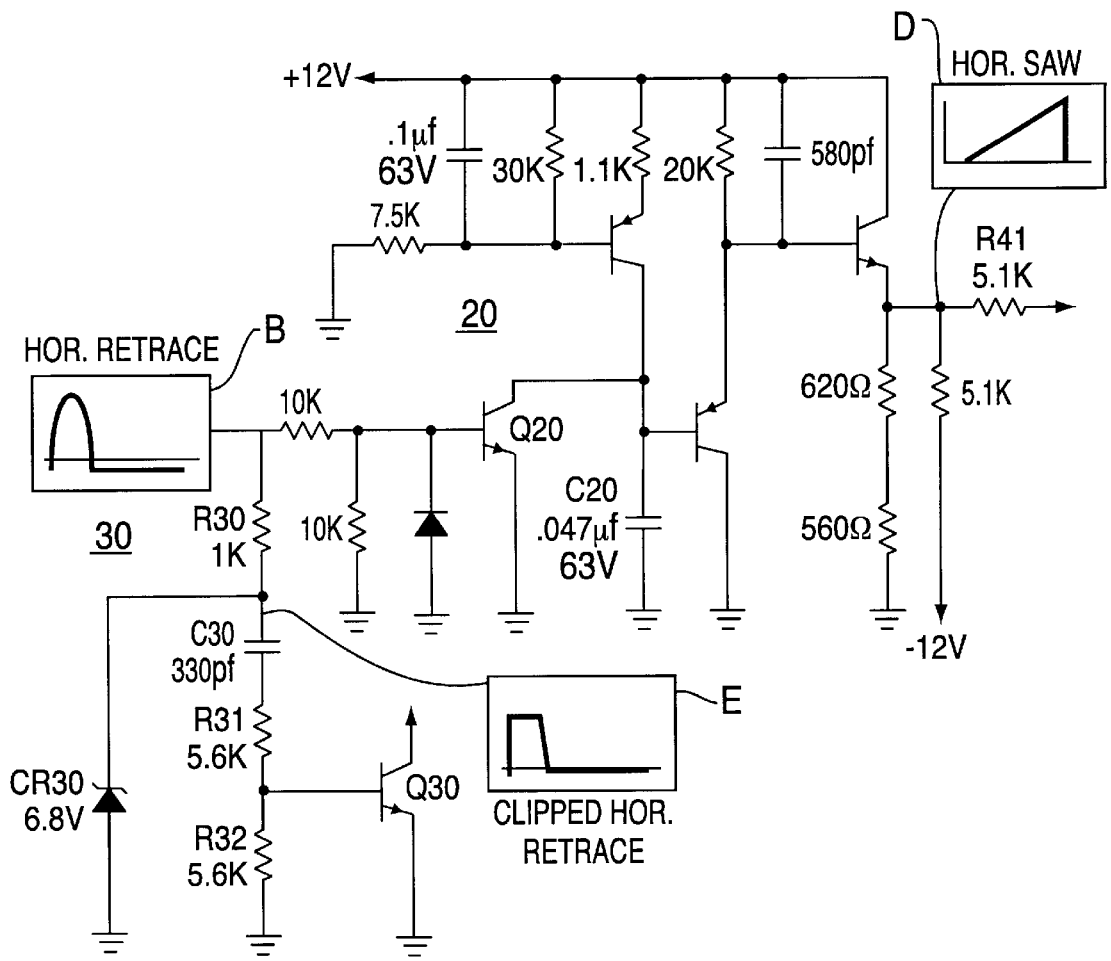
FIG. 8 is a schematic diagram of the horizontal sawtooth generator and the clipper, each shown in FIG. 4.

Adjustment of the power amplifier by pulse duration can be accomplished with transistor Q30. The horizontal retrace pulses according to waveform B, at 22 volts peak to peak, are also an input to a clipper circuit 30. As shown in FIG. 8, the clipper circuit 30 comprises resistor R30 and Zener diode CR30. The Zener diode CR30 is rated at 6.8 volts. The output of the clipper circuit 30 is a clipped horizontal retrace pulse having a positive peak of 6.8 volts and a negative peak of −0.6 volts. The clipped retrace pulses, at a level of 7.4 volts peak to peak are AC coupled to the base of transistor Q30 through capacitor C30 and through a voltage divider formed by resistors R31 and R32. Transistor Q30 turns on at the rising edge of this clipped horizontal retrace pulse and turns off at a time determined by capacitor C30 and resistor R31. The collector of transistor Q30 is also coupled to the summing junction 45, and added to the horizontal sine and the horizontal saw. The net result of the summation is shown in waveform H.

Figure 1:
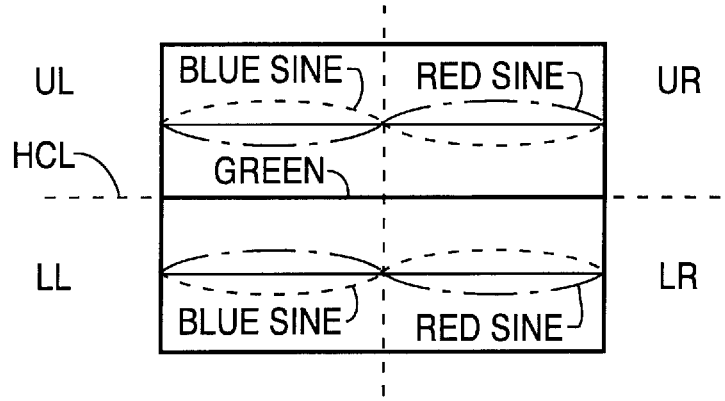
FIG. 1 a diagram useful for explaining differential sine distortion of red and blue in the horizontal lines.
Figure 2:
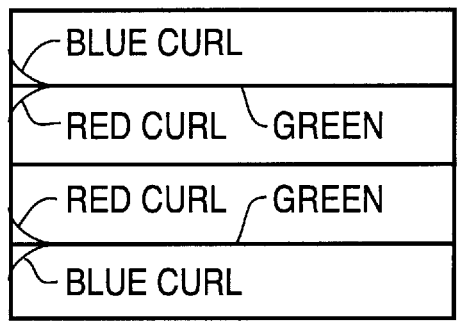
FIG. 2 is a diagram useful for explaining differential left-edge curl distortion of horizontal lines.
Figure 3:
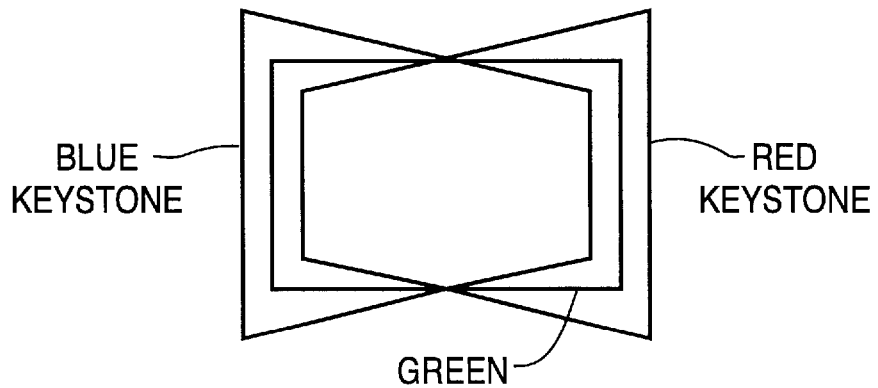
FIG. 3 is a diagram useful for explaining keystone distortion.

It has been discovered that the distortion that causes the red and blue horizontal lines to curl differentially up and down at the left edge of the picture, as shown in FIG. 2, can be corrected without resort to the addition of clipped horizontal retrace waveform E at summing junction 45, as heretofore described. The correction of the differential curl on the left edge of the picture can also be effected by applying equal damping to each of the vertical yoke coils to suppress horizontal-rate currents in the vertical yoke windings.

Figure 13:
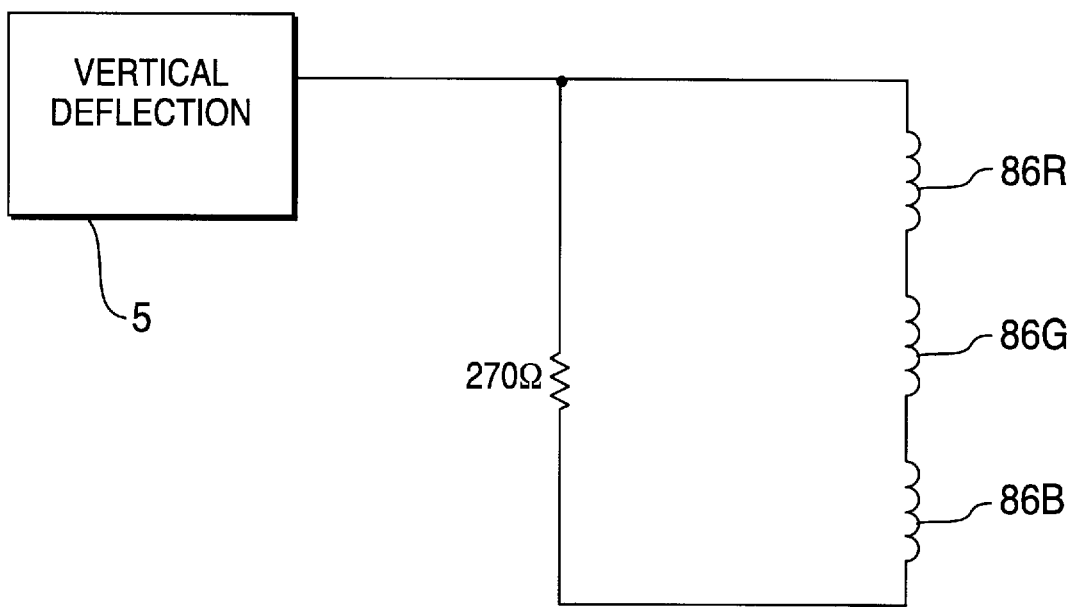
FIGS. 13 and 14 are schematic diagrams useful for explaining damping of the vertical yoke coils in a projection television receiver.
Figure 14:
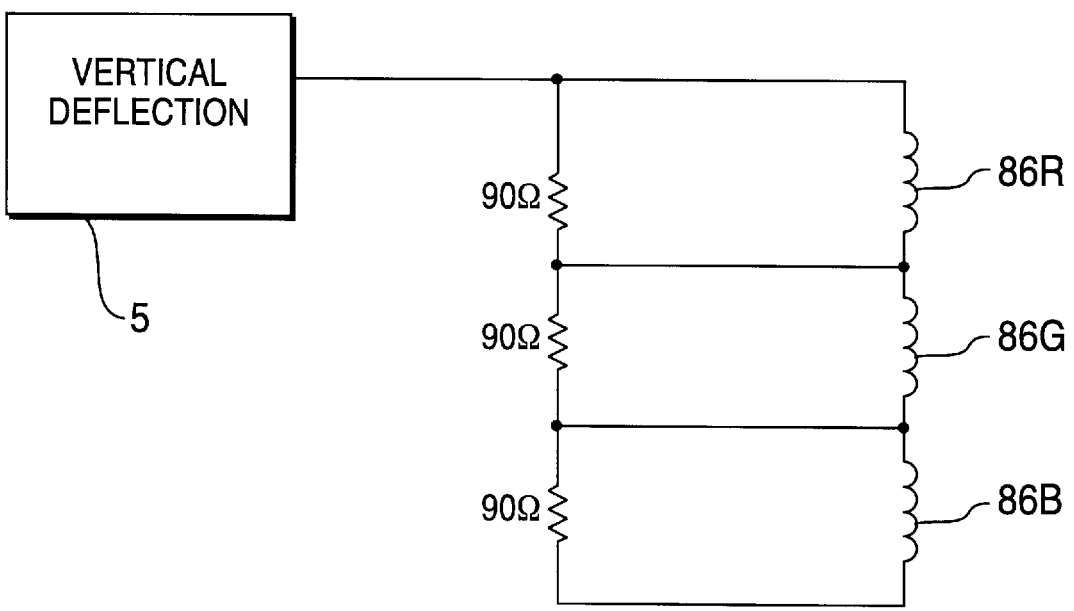

Referring to FIG. 13, vertical deflection circuit 5 drives main vertical deflection coils 86. Vertical deflection circuit 5 requires a specified load resistance to ensure proper operation; in this case a 270Ω load resistance is required. A series coupling of main vertical deflection coils 86 is coupled in parallel with the 270Ω resistance. In this configuration, at high frequency the center one of main vertical deflection coils 86 behaves like a voltage generator loaded by the other two of main vertical deflection coils 86. Large, horizontal-rate circulating currents can be induced into the center one of main vertical deflection coils 86 by corresponding ones of main horizontal deflection coils 87 and auxiliary deflection coils 89. The induced horizontal-rate circulating current is passed to the other two of main vertical deflection coils 86 because of the coils' series interconnection. The circulating currents can be suppressed by damping each of main vertical deflection coils 86 with an equal parallel resistance, as shown in FIG. 14. The values for the damping resistances are chosen such that the damping resistances are equal and the sum of the damping resistances equals the load resistance required by vertical deflection circuit 5.

Figure 11:
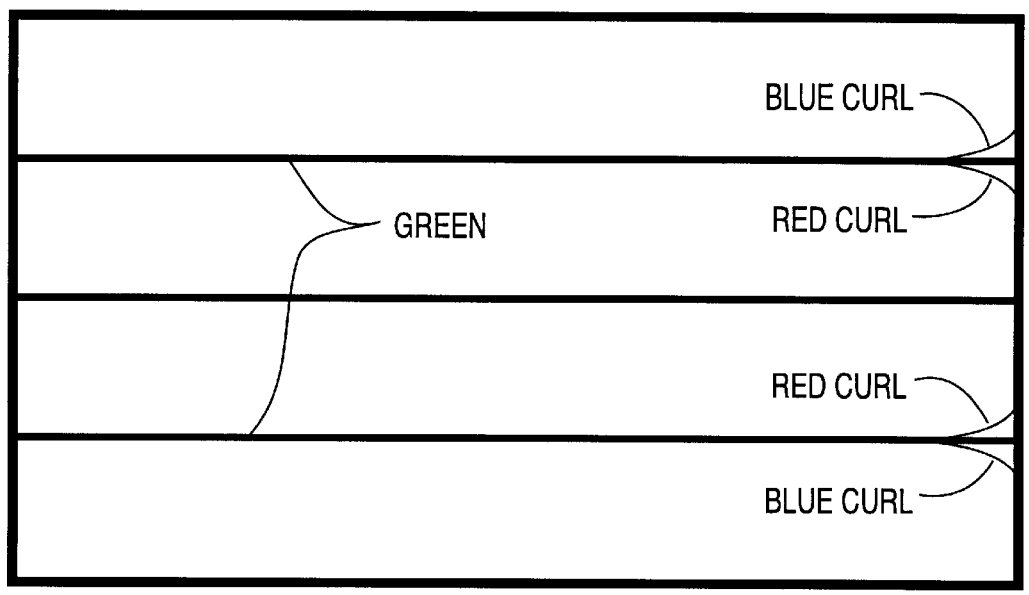
FIG. 11 is a diagram useful for explaining differential right-edge curl distortion of horizontal lines.

However, the application of such damping in combination with an earlier phase for the horizontal sawtooth signal M introduces a convergence distortion at the right edge of the picture, as shown in FIG. 11. Specifically, the red lines curl toward the horizontal centerline and the blue lines curl away from the horizontal centerline.

Figure 16:
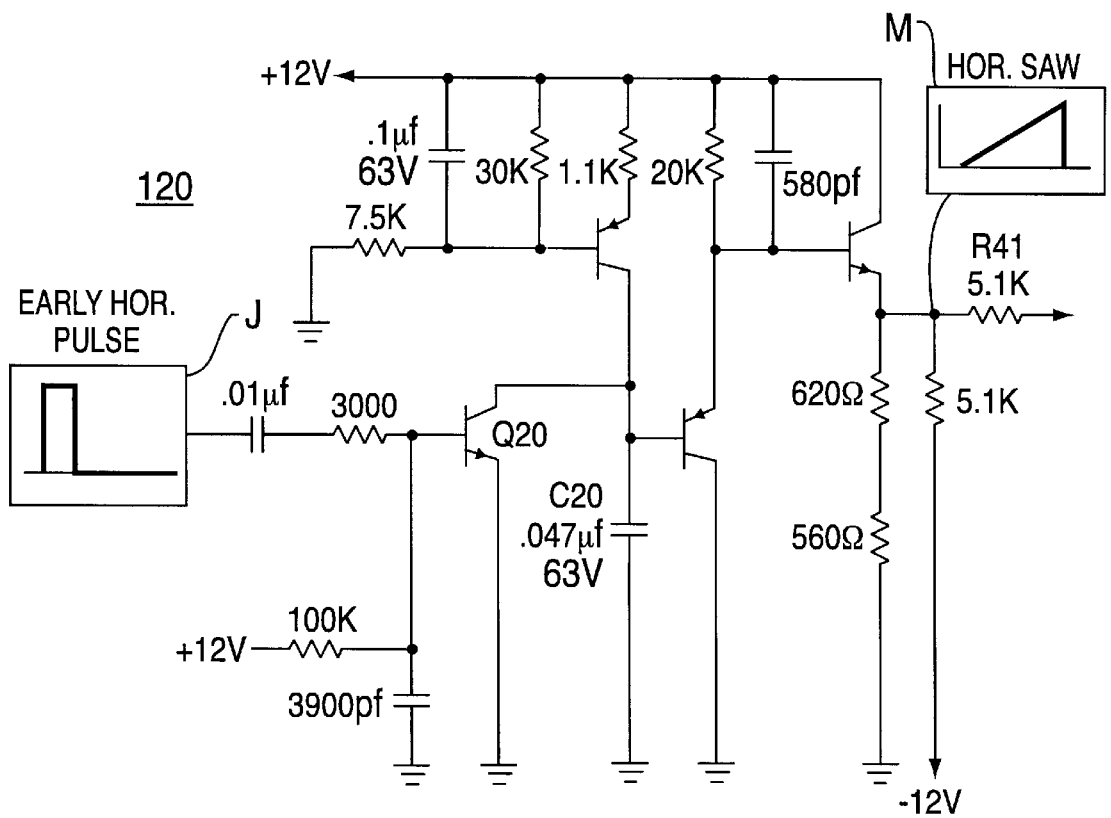
FIG. 16 a schematic diagram of the horizontal sawtooth generator shown in FIG. 12.
Figure 12:
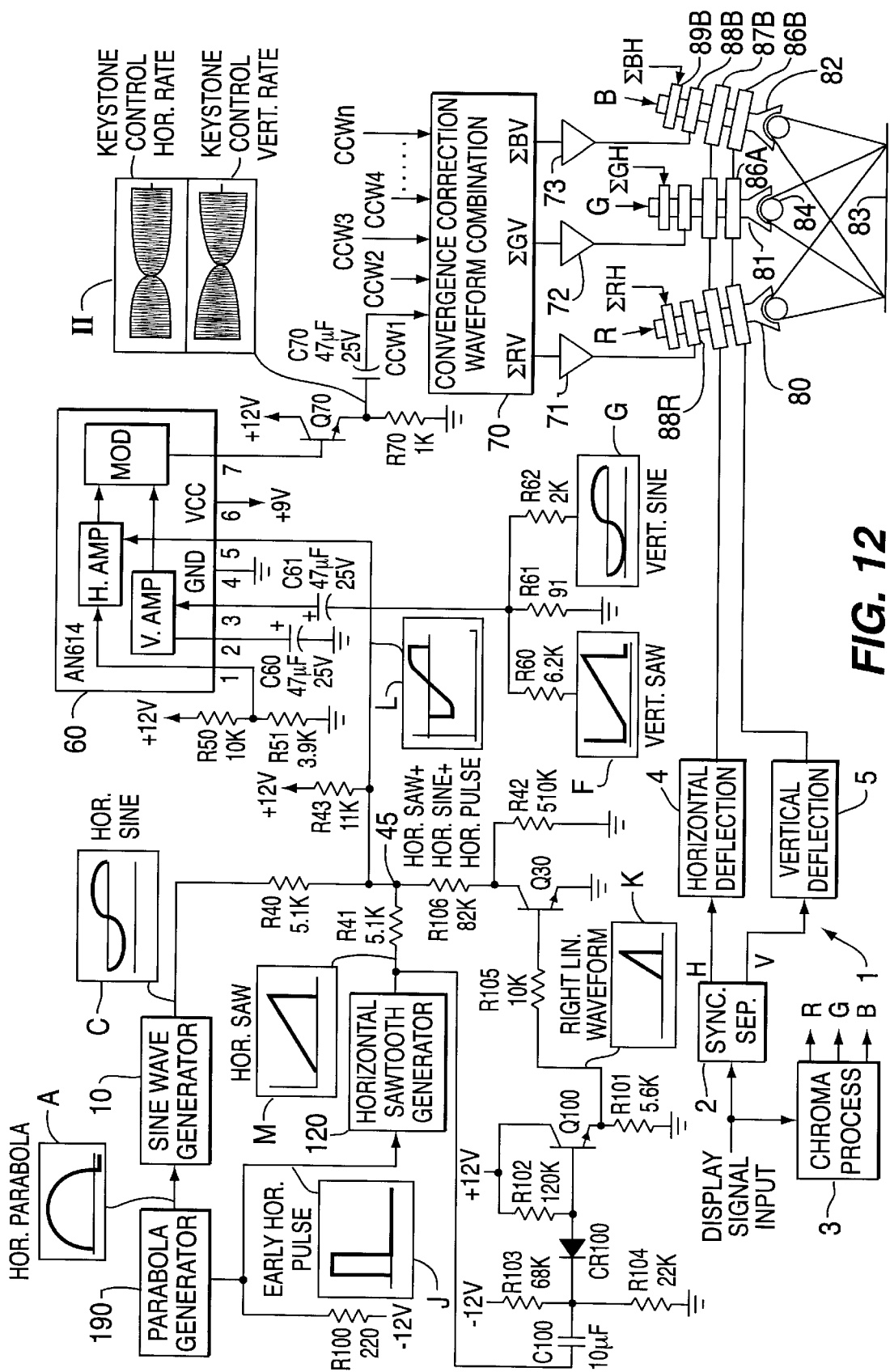
FIG. 12 is a diagram, in block and schematic form, of a projection television receiver, including a circuit for correcting keystone distortion, differential sine distortion of red and blue in the horizontal lines and differential right-edge curl distortion of horizontal lines.

If the differential left-edge curl is corrected by equally damping each of the vertical yoke coils, transistor Q30 can be used to rectify the differential right-edge curl. Referring to FIGS. 12 and 16, an early horizontal pulse signal J taken from parabola generator 190 is used to generate horizontal sawtooth signal M.

Figure 15:
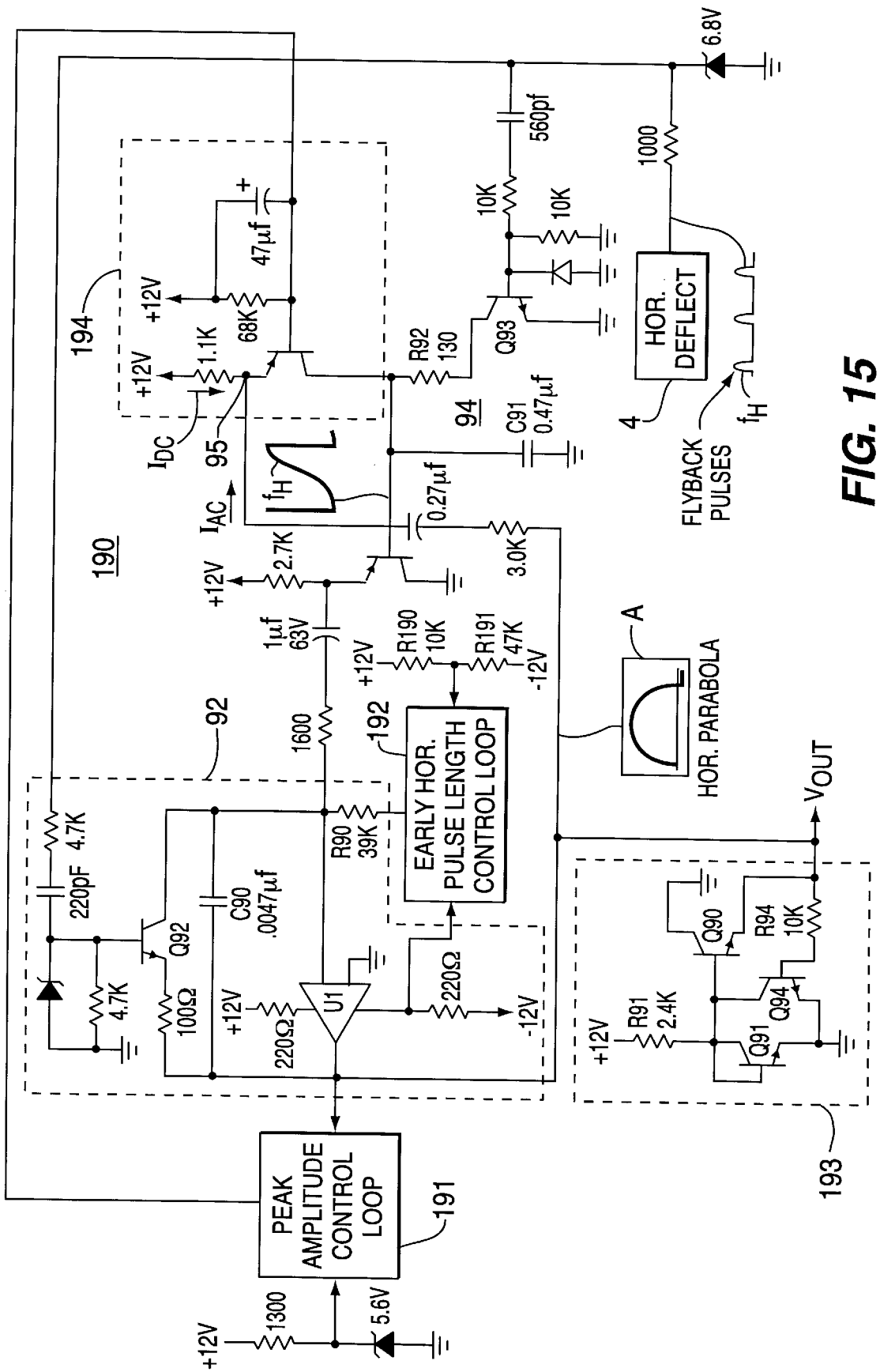
FIG. 15 is a schematic diagram of the parabola generator shown in FIG. 12.

Referring to FIG. 15, parabola generator 190 is similar to parabola generator 90, shown in FIG. 5, except parabola generator 190 has two added feedback loops which render horizontal-rate parabola A more stable and less susceptible to component tolerances. Peak amplitude control loop 191 compares the peak amplitude of horizontal-rate parabola A to a voltage set by a low-tolerance Zener diode CR190, and adjusts the amplitude of the horizontal-rate sawtooth signal which is AC coupled to integrator 92 to maintain a peak amplitude of +5.6 volts for horizontal-rate parabola A. Early horizontal pulse length control loop 192 compares the average DC value of a negative-going pulse, which is derived from early horizontal pulse signal J and has an amplitude equal to the total voltage across resistors R190 and R191, to the voltage present at the junction of resistors R190 and R191, and adjusts a current flowing into operational amplifier U1 through resistor R90 so as to maintain a proportion between the pulse width of the negative-going pulse and the horizontal scan period that is determined by the ratio of resistor R190 to the sum of resistors R190 and R191. In the parabola generator 190 of FIG. 15, the pulse width of the negative-going pulse is set to be (10/57)(63.5 $\mu$sec), or approximately 11 $\mu$sec.

Referring to FIG. 16, horizontal sawtooth generator 120 is similar to horizontal sawtooth generator 20, shown in FIG. 8, except horizontal sawtooth generator 120 is reset by early horizontal pulse signal J, which has the effect of advancing horizontal sawtooth signal M in phase with respect to the horizontal reset pulses.

A horizontal right linearity signal K is derived from horizontal sawtooth signal M and is used to turn "on" transistor Q30. The resulting negative pulse at the collector of transistor Q30 is added via gain-determining resistor R106 to horizontal sine signal C and horizontal sawtooth signal M. The composite signal is then multiplied by vertical sawtooth signal F to produce waveform II.

Horizontal right linearity signal K is a triangular pulse that follows the last few microseconds of horizontal sawtooth signal M; it has a peak of 0.8 volts and is zero otherwise. The voltage at the output of horizontal saw generator 120 is coupled to the base of transistor Q100 through capacitor C100. Once horizontal sawtooth signal M reaches a level of approximately 2.7 volts, transistor Q100 turns "on" sufficiently for the emitter of transistor Q100 to track horizontal sawtooth signal M. The output of transistor Q100 thus tracks the last few microseconds of horizontal sawtooth signal M to produce horizontal right linearity signal K. Diode CR100 compensates for the voltage drop at the base-emitter junction of transistor Q100.

Horizontal right linearity signal K is then coupled to the base of transistor Q30 by resistor R105. Transistor Q30 turns "on" when horizontal right linearity signal K exceeds Q30's base-to-emitter threshold voltage. The resulting negative pulse at the collector of transistor Q30 is coupled through resistor R106 to horizontal input pin 5 of multiplier 60, where the negative pulse is summed with horizontal sine signal C and horizontal sawtooth signal M at summing junction 45 to produce horizontal composite waveform L.

The effect of the pulses from transistor Q30 is to cause a slight extra flattening of the right peak of horizontal composite waveform L. When this effect is multiplied by the vertical sawtooth signal F, and subsequently fed to the red and blue amplifiers 74 and 75, shown in FIG. 9, which amplify it oppositely, the right-edge differential curl is corrected.

Figure 9:
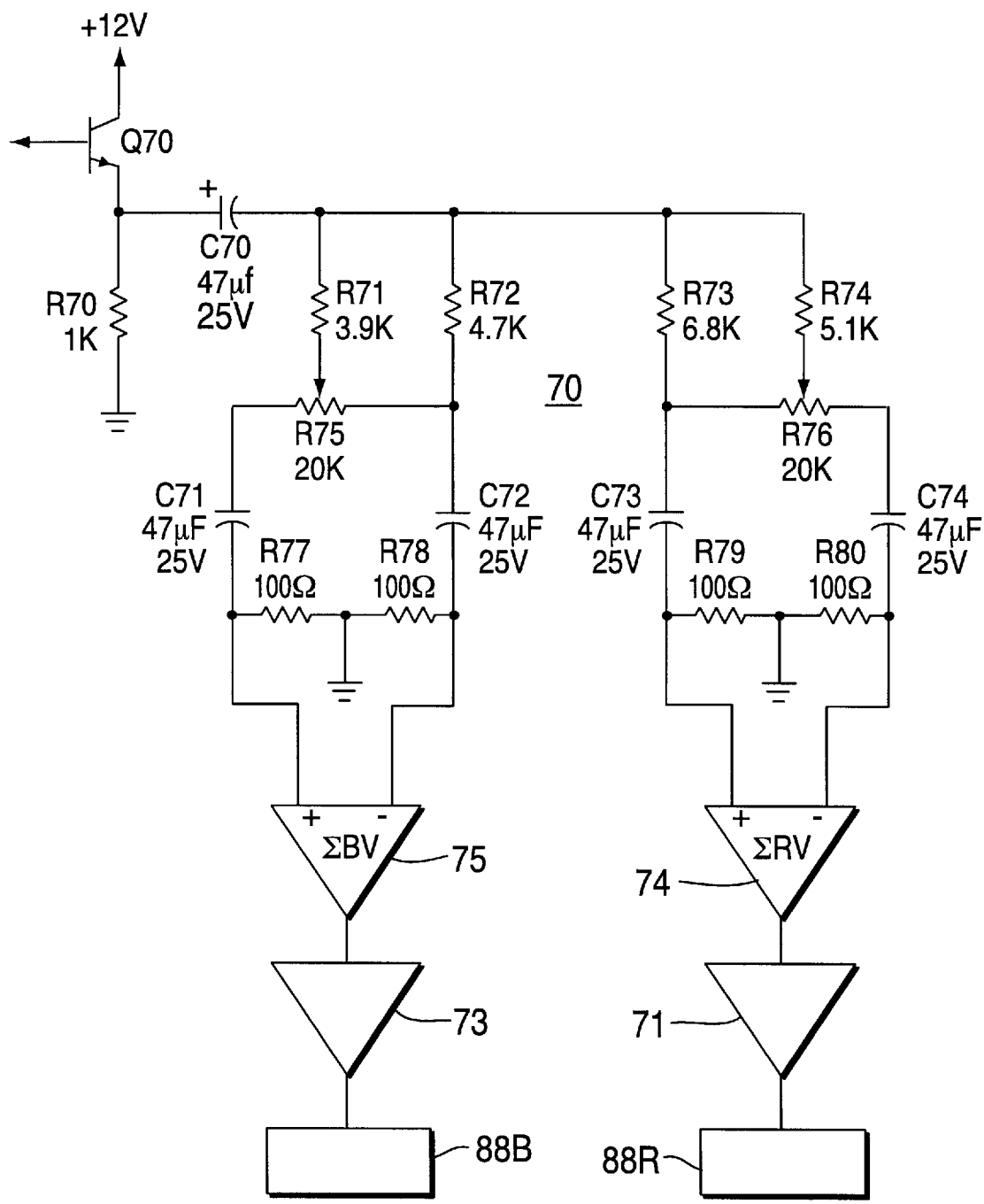
FIG. 9 is a schematic diagram of the convergence correction waveform output circuit shown in block form in FIG. 4.
Figure 10:
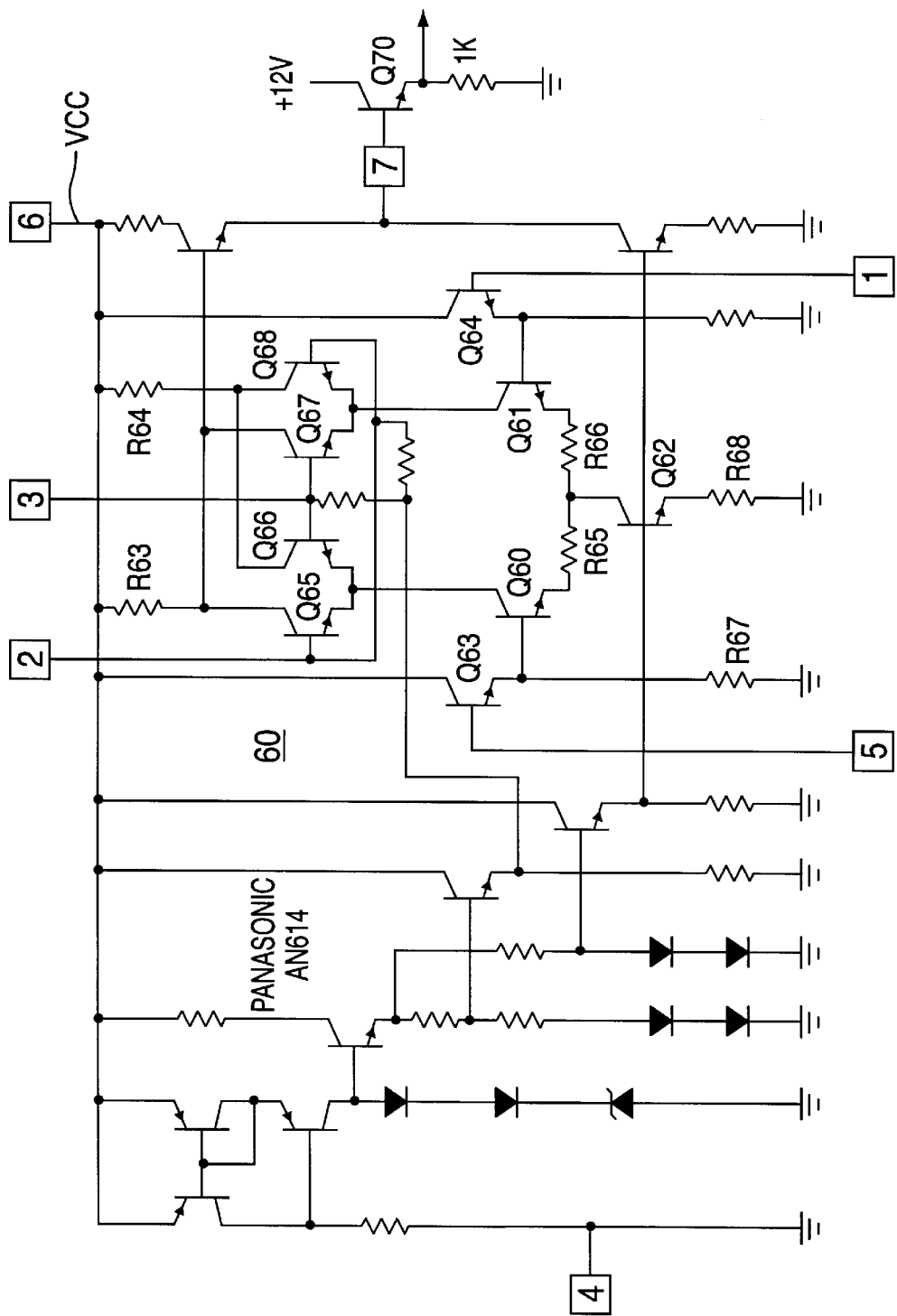
FIG. 10 is a schematic diagram of the AN614 integrated circuit, shown in block form in FIG. 4.

Referring to FIG. 9, resistors R72 and R73 are range-centering resistors for keystone controls R75 and R76, respectively. Their values are chosen to roughly correct the keystone when the controls are centered. Resistors R71 and R74 adjust the control sensitivity and range.

Waveforms I and II of FIGS. 4 and 12 illustrate the keystone correction waveforms at both the horizontal and vertical-rates. In each case, the peak to peak voltage is 2.4 volts and the DC level is 8.37 volts. Waveform I solves problems raised by differential sine and left-edge curl distortions, and waveform II solves problems raised by differential sine and right-edge curl distortions. Firstly, the differential sine and both edge curl distortions are corrected; and, secondly, the correction of the differential sine and both edge curl distortions does not interfere with other convergence corrections. Moreover, the differential sine and both edge curl distortions can be corrected very efficiently by modifying the existing keystone distortion convergence correction waveforms.

Having described a preferred embodiment of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A correction circuit for a cathode ray tube displaying images subject to distortion, said circuit comprising:

means for summing three horizontal-rate waveforms to define a horizontal-rate composite waveform;

means for generating as an output signal a product of said horizontal-rate composite waveform and a vertical rate waveform;

means for amplifying said output signal; and, a correction coil for said cathode ray tube coupled for receiving said amplified output signal and generating a dynamic magnetic field responsive to said output signal, said output signal having a first component for correcting a keystone distortion, a second component for correcting a red/blue sinusoidal distortion and a third component for correcting a red/blue right-edge curl distortion.

2. The circuit of claim 1, wherein said keystone distortion is due to off-axis orientation of said cathode ray tube, said red/blue sinusoidal distortion is due to face plate geometry of said cathode ray tube and said red/blue right-edge curl distortion is imparted by a shift of a reset pulse of one of said horizontal-rate waveforms to an earlier time with respect to a horizontal retrace to center a pivot point of vertical skew and key adjustments.

3. The circuit of claim 1, wherein said horizontal-rate composite waveform is DC coupled to said product generating means.

4. The circuit of claim 1, further comprising means for generating a horizontal-rate sawtooth waveform, a horizontal-rate, generally sinusoidal waveform and a horizontal-rate pulse waveform, coupled to said summing means for forming said composite waveform.

5. A projection television receiver, comprising:

a plurality of cathode ray tubes, each of said cathode ray tubes having a vertical yoke coil and each of said vertical yoke coils coupled to one another in series;

a plurality of damping resistances, each of said damping resistances coupled in parallel across one of said vertical yoke coils and in series with one another;

means for summing three horizontal-rate waveforms to define a horizontal-rate composite waveform;

means for generating as an output signal a product of said horizontal-rate composite waveform and a vertical rate waveform;

means for amplifying said output signal; and, a correction coil for one of said cathode ray tubes coupled for receiving said amplified output signal and generating a dynamic magnetic field responsive to said output signal, said output signal having a first component for correcting a keystone distortion, a second component for correcting a red/blue sinusoidal distortion and a third component for correcting a red/blue right-edge curl distortion.

6. The projection television receiver of claim 5, wherein said keystone distortion is due to off-axis orientation of said cathode ray tube, said red/blue sinusoidal distortion is due to face plate geometry of said cathode ray tube and said red/blue right-edge curl distortion is imparted by a shift of a reset pulse of one of said horizontal-rate waveforms to an earlier time with respect to a horizontal retrace to center a pivot point of vertical skew and key adjustments.

7. The projection television receiver of claim 5, wherein said horizontal-rate composite waveform of each of said cathode ray tubes is DC coupled to said product generating means of each of said cathode ray tubes.

8. The projection television receiver of claim 5, further comprising means for generating for each of said cathode ray tubes a horizontal-rate sawtooth waveform, a horizontal-rate, generally sinusoidal waveform and a horizontal-rate pulse waveform, coupled to said summing means of each of said cathode ray tubes for forming said composite waveform for each of said cathode ray tubes.

9. The projection television receiver of claim 5, wherein said damping resistances are equal.

10. A correction circuit for a cathode ray tube displaying images subject to distortion, said circuit comprising:

means for generating a horizontal-rate sawtooth waveform;

means for generating a horizontal-rate pulse waveform;

means for generating a horizontal-rate, generally sinusoidal waveform;

means for summing said horizontal-rate sawtooth, pulse and generally sinusoidal waveforms to define a horizontal-rate composite waveform;

means for generating as an output signal a product of said horizontal-rate composite waveform and a vertical-rate waveform, said horizontal-rate composite waveform being DC coupled to said product generating means;

means for amplifying said output signal; and, a correction coil for said cathode ray tube coupled for receiving said amplified output signal and generating a dynamic magnetic field responsive to said output signal, said output signal having a first component for correcting a keystone distortion, a second component for correcting a red/blue sinusoidal distortion and a third component for correcting a red/blue right-edge curl distortion.

11. The circuit of claim 10, wherein said keystone distortion is due to off-axis orientation of said cathode ray tube, said red/blue sinusoidal distortion is due to face plate geometry of said cathode ray tube and said red/blue right-edge curl distortion is imparted by a shift of a reset pulse of one of said horizontal-rate waveforms to an earlier time with respect to a horizontal retrace to center a pivot point of vertical skew and key adjustments.

12. A projection television receiver, comprising:

a plurality of cathode ray tubes, each of said cathode ray tubes having a vertical yoke coil and each of said vertical yoke coils coupled to one another in series;

a plurality of damping resistances, each of said damping resistances coupled in parallel with an associated one of said vertical yoke coils;

means for generating a horizontal-rate sawtooth waveform;

means for generating a horizontal-rate pulse waveform;

means for generating a horizontal-rate, generally sinusoidal waveform;

means for summing said horizontal-rate sawtooth, pulse and generally sinusoidal waveforms to define a horizontal-rate composite waveform;

means for generating as an output signal a product of said horizontal-rate composite waveform and a vertical-rate waveform, said horizontal-rate composite waveform being DC coupled to said product generating means;

means for amplifying said output signal; and, a correction coil for one of said cathode ray tubes coupled for receiving said amplified output signal and generating a dynamic magnetic field responsive to said output signal, said output signal having a first component for correcting a keystone distortion, a second component for correcting a red/blue sinusoidal distortion and a third component for correcting a red/blue right-edge curl distortion.

13. The projection television receiver of claim 12, wherein said keystone distortion is due to off-axis orientation of one of said cathode ray tubes, said red/blue sinusoidal distortion is due to face plate geometry of one of said cathode ray tubes and said red/blue right-edge curl distortion is imparted by a shift of a reset pulse of one of said horizontal-rate waveforms to an earlier time with respect to a horizontal retrace to center a pivot point of vertical skew and key adjustments.

14. The projection television receiver of claim 12, wherein said damping resistances are equal.

* * * * *